May 24, 1949.  A. LANKOVSKI ET AL  2,470,778
HYDRAULIC SYSTEM FOR SELF-LOADING TRUCKS
Filed June 25, 1946  2 Sheets-Sheet 1
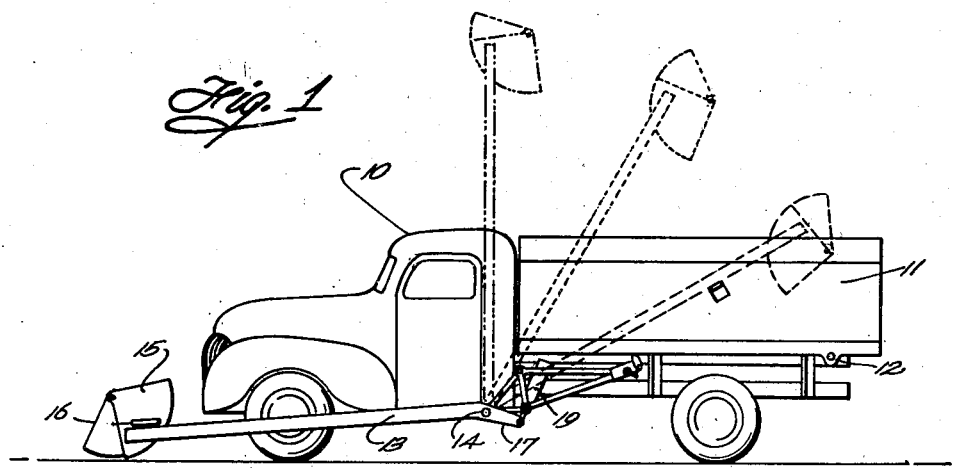
Fig. 1
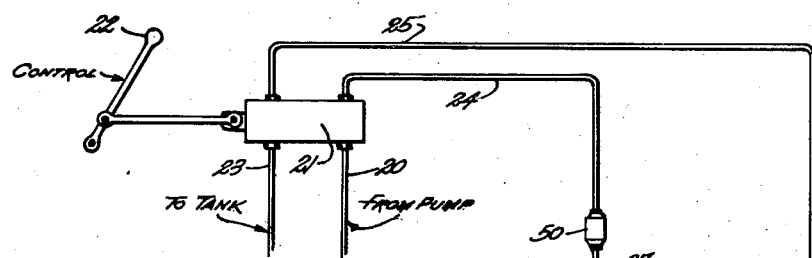
Fig. 2
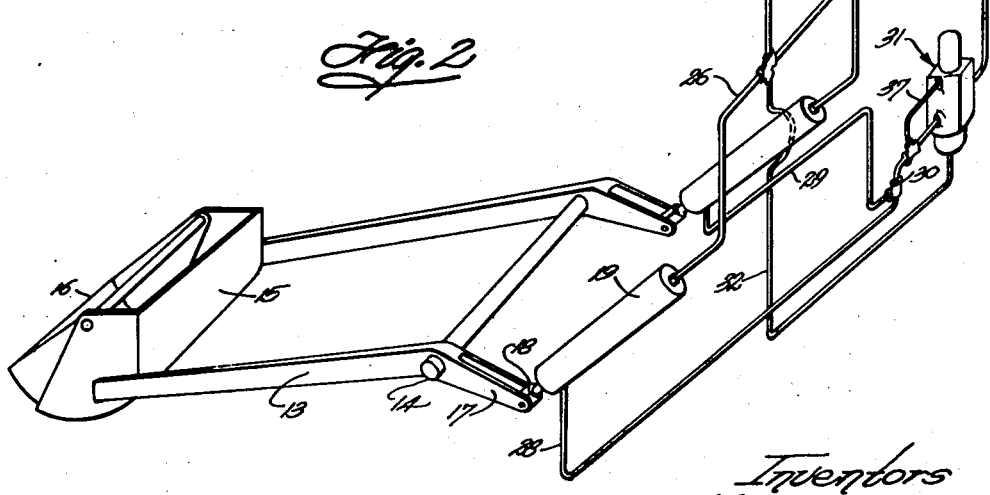
Inventors
Michael Graves
Anatoly Lankovski
By Hungerford Miller
Attorneys May 24, 1949.  A. LANKOVSKI ET AL  2,470,778
HYDRAULIC SYSTEM FOR SELF-LOADING TRUCKS
Filed June 25, 1946  2 Sheets-Sheet 2

Inventors
MICHAEL GRAVES
ANATOLY LANKOVSKI
By Hazard and Miller
Attorneys

Patented May 24, 1949

2,470,778

UNITED STATES PATENT OFFICE 2,470,778

HYDRAULIC SYSTEM FOR SELF-LOADING TRUCKS

Anatoly Lankovski and Michael Graves, Los Angeles, Calif., assignors to Matthew B. Butler, Chicago, Ill.

Application June 25, 1946, Serial No. 679,244

9 Claims. (Cl. 214—78)

This invention relates to improvements in self-loading trucks, and may be regarded as an improvement over the disclosure made in our co-pending application Serial No. 637,872, filed December 29, 1945, now Patent No. 2,457,039 granted Dec. 21, 1948.

In the above-mentioned application there is disclosed a self-loading truck wherein arms are pivotally mounted on the truck adjacent the sides thereof and which extend forwardly of the chassis of the truck carrying a scoop at their forward ends which can be loaded such as by driving the truck forwardly toward a pile of material that is to be loaded into the truck. Hydraulic means is provided for causing the arms and scoop carried thereby to be swung upwardly and rearwardly to a position over the cab of the truck to dump the contents of the scoop into the body of the truck. Pads or stops are provided on the sides of the body of the truck against which the arms may rest during transport and which limit the rearward swinging movements of the arms.

When the scoop is heavily loaded fluid pressure is supplied to hydraulic cylinders to swing the arms and their load upwardly. However, on passing through a vertical position the load tends to descend by gravity and to cause the arms to overrun or to proceed at a faster rate than that at which the fluid can be supplied to the hydraulic cylinders which actuate the arms. This overrunning tendency may cause the arms to crash heavily against the stops or pads on the sides of the truck damaging either the arms or the truck body. When the arms are swung forwardly from their unloading positions to return to the loading position a similar action of overrunning may occur even though the scoop is unloaded and this tends to lower the scoop into engagement with the ground forwardly of the truck heavily.

An object of the present invention is to provide an improved hydraulic system for actuating the arms of a self-loading truck wherein when the arms and load that is thereby carried pass through a vertical position and tend to overrun they will be automatically and instantly retarded in their movements so that they will not descend heavily against the stops or pads nor lower the scoop into engagement with the ground with objectionable or destructive forces.

With the foregoing and other objects in view, which will be made manifest in the following detailed description and specifically pointed out in the appended claims, reference is made to the accompanying drawings for an illustrative embodiment of the invention, wherein:

Figure 1 is a view in side elevation of a self-loading truck embodying the present invention;

Fig. 2 is a schematic view in perspective illustrating the hydraulic system embodying the present invention.

Figure 3:
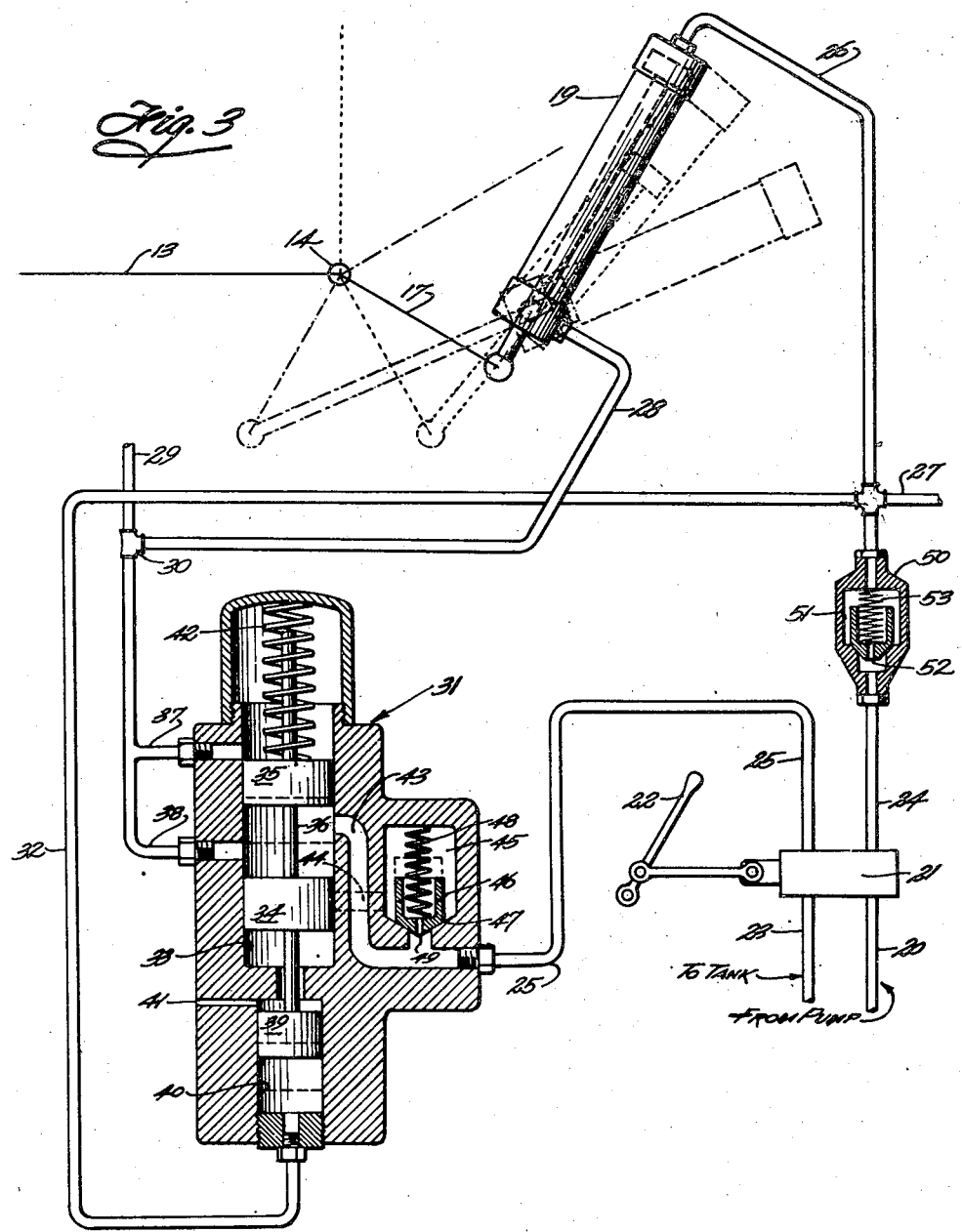
Fig. 3 is a schematic view of the hydraulic system illustrating in vertical section details of valve constructions forming parts of the present invention.

Referring to the accompanying drawings wherein similar reference characters designate similar parts throughout, 10 indicates a truck having a body 11 preferably of the type that can be tilted for unloading purposes as at 12. On the sides of the chassis there are arms 13 pivotally mounted as at 14 and carrying a scoop 15 between their forward ends that is adapted to be loaded with material to be loaded into the truck body 11. The scoop may be equipped with a hydraulically actuated closure 16.

The arms 13 are equipped with crank arms 17 to which the piston rods 18 of pistons that are reciprocable in hydraulic cylinders 19 are pivotally connected. The cylinders may be mounted for movement relatively to the chassis in the manner disclosed in our copending application, or in any other suitable manner to accommodate themselves to the movements of the crank arms 17.

From a pump, not shown, liquid such as oil is supplied under pressure through a supply line 20 to a control valve 21 operable by a control lever 22 that is preferably located in the cab of the truck. A return line 23 leads from the control valve to a reservoir or tank. The control valve may be of any preferred or conventional construction which will optionally deliver fluid under pressure from the supply line 20 to line 24 or line 25. When the control valve connects line 20 with line 24, line 25 is simultaneously connected with line 23 to return fluid from the system to the tank. Conversely, when the control valve 22 connects line 20 with line 25, line 24 is connected simultaneously to line 23 to return fluid to the tank. The tank continuously supplies oil to the pump.

Line 24 leads to two branch lines 26 and 27 which are in turn connected to the upper ends of the hydraulic cylinders 19 and when fluid pressure is thus supplied to the upper ends of the hydraulic cylinders their pistons are effective to swing the arms 13 upwardly and rearwardly from the full line position shown in Fig. 1 toward the dotted line positions shown therein. The lower ends of the hydraulic cylinders 19 have pipes or conduits 28 and 29 connected thereto which are connected together as at 30 and lead to a valve generally indicated at 31 to which line 25 is connected. A branch line 32 also connects line 24 with the valve 31.

The details of the valve 31 are illustrated in Fig. 3. It consists of a suitable housing within which there is a cylinder 33 within which is a reciprocable balanced valve consisting of spaced pistons 34 and 35 connected by a reduced neck 36. The two lines 28 and 29 after being connected at 30 are branched as at 37 and 38 with the branch 38 connecting with the cylinder 33 opposite the neck 36. The branch 37 is connected to the top of the cylinder 33 above the upper piston 35. The bottom of the valve has a stem secured thereto that is connected to a relatively small piston 39 which is reciprocable in a cylinder 40 in the bottom of the housing. The upper end of this cylinder is preferably vented as at 41 to provide for the escape of any liquid that may leak into this upper end. The valve formed by the piston 34 and 35 and their connecting neck 36 is normally urged downwardly by compression spring 42 but when the valve is in its uppermost position substantially as illustrated in Fig. 3, it establishes communication between the branch 38 and an outlet port 43. However, when the valve is shifted into its lowermost position port 43 will be closed by the piston 35 and branch 38 will be placed in communication with a bypass port 44. The bypass port leads to a valve chamber 45 in which is disposed a check valve 46 urged against its seat 47 by means of a compression spring 48. This check valve has a throttling aperture 49 formed therein which will permit the flow of fluid at a relatively slow rate into the return line 25 of port 43. In the line 24 there is a check valve consisting of a housing 50 within which there is a plunger 51 that has a small aperture 52 therein and which is urged to seat against its seat by a compression spring 53. This check valve is so arranged as to permit flow to occur readily or easily through the line 24 toward the cylinders 19 but to retard flow in the reverse direction.

Assuming that the scoop or shovel 15 has been fully loaded the control valve is positioned so that fluid under pressure is supplied from the pump through the lines 20 and 24 to the branches 26 and 27 to the upper ends of the hydraulic cylinders 19. This forces the pistons therein downwardly and causes the arms 13 to be swung upwardly and rearwardly. As the arms approach their vertical positions indicated by dotted lines on Fig. 1, the proportion of the load that must be carried by the liquid in the hydraulic cylinders decreases and more and more of the load is shifted so as to be supported by the pivots 14. Consequently, the pressure of the liquid supplied to the cylinders through the line 24 decreases. The pressure developed in the line 24 is transmitted through the branch 32 to the cylinder 40 and at the beginning of the lift of the load this high pressure is effective to cause the piston 39 to elevate the valve in the housing against the action of the compression spring 42. When the valve is in its uppermost position as shown, liquid returning from the bottoms of the cylinders 19 may readily or easily flow from branch 38 to the outlet port 43 and into the return line 25. However, when the arms approach the vertical position or pass through the vertical position and the load begins to descend under gravity the pressure supplied to the line 24 decreases and consequently the pressure in the cylinder 40 will correspondingly decrease. When this pressure has fallen sufficiently spring 42 is automatically effective to move the valve from the position shown to its lower position wherein communication between branch 38 and outlet 43 is closed and branch 38 is placed in communication with the bypass 44. Fluid which is returning from the bottoms of the cylinders 19 is then caused to pass into the valve chamber 45 and is caused to flow through the relatively small throttling aperture 49 before returning to the return line 25. This throttling of the returned fluid places a resistance on the descent of the arms so that the scoop or shovel 15 is automatically retarded as it completes its rearward swinging movement, thus preventing its crashing on the stops or pads applied to the sides of the truck body.

As soon as the valve shifts to cause the returning fluid to be throttled through the aperture 49 the resistance causes the pressure in the supply line 24 to quickly build up again. This pressure would be effective on the piston 39 tending to reopen the valve and place the branch 38 in communication with the outlet port 43. However, the throttling of the fluid through the throttling aperture 49 also places increased pressure in both the branches 37 and 38 and the increase in pressure through the branch 37 becomes effective on the top of piston 35 to maintain the valve in its downward or bypassing position against the effect of the increase in pressure in the line 24 that is effective on piston 39. Consequently once that the valve has shifted into its lowermost position it will be maintained in that position despite the fact that there may be a momentary increase in pressure in the supply line 24.

When the load has been dumped from the scoop or shovel 15 and the control valve 21 is shifted to return the shovel to its position in front of the truck fluid from the pump is then transmitted through the line 25 to the valve 31 and unseats the valve 45 and on passing through the bypass 44 to the branch 38 it flows to the bottoms of the cylinders 19. Fluid returning from the tops of the cylinders 19 must be forced through the throttling aperture 52 so that the return movement of the scoop or shovel is continuously retarded from the very beginning of its forward movement. Although this retarding action begins before the scoop or shovel has reached its highest point it is not objectionable due to the fact that the scoop or shovel is unloaded during such return movement. The retarding effect prevents the scoop or shovel returning to the ground in front of the truck with any tendency to crash.

It will, of course, be appreciated that as the scoop passes through its uppermost position in lifting the load from the ground over the cab that the load spills and drops from the scoop into the body of the truck.

From the above-described construction it will be appreciated that when the scoop is fully loaded and is being lifted to the vertical position fluid from the pump is being supplied through line 24 to the upper ends of the cylinders with a minimum amount of friction or resistance so as to be effective to lift the load to its highest point. Then, as soon as the load begins to descend under gravity and accelerate downward movements of the arms 13 a resistance is automatically and instantaneously applied to the fluid returning through the lines 28 and 29 which theretofore were fully open to facilitate return of fluid from the lower ends of the cylinders 19. In other words, during the lifting of the load no resistance is applied to the returning fluid from the lower ends of the cylinders but as soon as the load starts to descend under gravity reducing the pressure in the line 24 a resistance is immediately and automatically applied to the returning fluid. Thus downward swinging movement of the arms is retarded and the arms allowed to be brought to rest gently against the stops or pads on the sides of the truck body 11. During the reverse movement the valve 50 in the line 24 imposes a resistance in the fluid returning from the upper ends of the cylinders 19 throughout the entire movement but this is not objectionable in that during such reverse movement the scoop is being swung from its lowermost position to its uppermost position while unloaded and the pressure from the pump is merely utilized to lift and swing the arms against the resistance of this valve. During the descent of the scoop the resistance is effective to prevent the scoop dropping into engagement with the ground with objectionable and destructive forces.

Various changes may be made in the details of construction without departing from the spirit and scope of the invention as defined by the appended claims.

We claim:

1. In combination with a truck having arms swingably mounted thereon for lifting a load and depositing it on the body of the truck through a position wherein the center of gravity of the load and arms is over the center of swing of the arms, hydraulic cylinders having pistons therein for actuating the arms, means for optionally supplying fluid pressure to either end of each cylinder and returning fluid from the other end thereof, and means for throttling the return of fluid from said other ends whenever the load begins to descend by gravity from said position so as to retard its descent.

2. In combination with a truck having arms swingably mounted thereon for lifting a load and depositing it on the body of the truck through a position wherein the center of gravity of the load and arms is over the center of swing of the arms, hydraulic cylinders having pistons therein for actuating the arms, means for optionally supplying fluid pressure to either end of each cylinder and returning fluid from the other end thereof, and means operable by a reduction in pressure in the fluid supplied to the cylinders to actuate the arms for throttling the fluid returned therefrom to retard descent of the load under the influence of gravity.

3. In combination with a truck having arms swingably mounted thereon for lifting a load and depositing it on the body of the truck through a position wherein the center of gravity of the load and arm is over the center of swing of the arms, hydraulic cylinders having pistons therein for actuating the arms, means for optionally supplying fluid pressure to either end of each cylinder and returning fluid from the other end thereof, a reciprocable balanced valve in the passage for returning fluid, an apertured check valve bypassing said reciprocable balanced valve, and pressure responsive means responsive to pressure supplied to said cylinders for opening the reciprocable balanced valve when the supplied pressures are high and allowing the reciprocable valve to close when the supplied pressures are low to cause the returning fluid to flow through the throttling aperture of the check valve and thus retard descent of the arms under the influence of gravity.

4. In combination with a truck having arms swingably mounted thereon for lifting a load and depositing it on the body of the truck, hydraulic cylinders having pistons therein for actuating the arms, means for optionally supplying fluid pressure to either end of each cylinder and returning fluid from the other end thereof, a check valve having an aperture therein disposed in the line supplying fluid pressure to one end of each cylinder, a check valve having an aperture in the line leading from the other end of each cylinder, and means responsive to a decrease in pressure in the first-mentioned line for causing flow to take place through the aperture in the check valve in the second-mentioned line, and upon an increase in pressure therein to bypass the check valve in the second-mentioned line.

5. In combination with a truck having arms swingably mounted thereon for lifting a load through a position wherein the center of gravity of the load and arms is over the center of swing of the arms, hydraulic cylinders having pistons therein for actuating the arms, means for optionally supplying fluid pressure to either end of each cylinder and returning fluid from the other ends thereof, and means for automatically restricting flow that is being returned when the pressure supplied to the cylinders is materially reduced by the load passing through the vertical position so as to retard descent of the arms.

6. In combination with a truck having arms swingably mounted thereon for lifting a load through a position wherein the center of gravity of the load and arms is over the center of swing of the arms, hydraulic cylinders having pistons therein for actuating the arms, means for optionally supplying fluid pressure to either end of each cylinder and returning fluid from the other ends thereof, and means for automatically restricting flow that is being returned comprising a throttling bypass, a valve operable to direct return flow through the bypass or around the bypass, and means operable by the pressure supplied to the cylinders for operating said valve whereby flow returning from the cylinders will be directed around the bypass until the center of gravity of the load and arms has passed over the center of swing and then due to the decrease of pressure supplied to the cylinders the return flow will be directed through the bypass to retard descent of the arms.

7. In combination with a truck having arms swingably mounted thereon for lifting a load through a position wherein the center of gravity of the load and arms is over the center of swing of the arms, hydraulic cylinders having pistons therein for actuating the arms, means for optionally supplying fluid pressure to either end of each cylinder and returning fluid from the other ends thereof, and means for automatically restricting flow that is being returned comprising means providing a bypass passage in the return conduit from the cylinders, a throttling check valve therein, a balanced valve between the bypass and the cylinders for directing flow through the bypass or around the bypass, means responsive to pressure supplied to the cylinders for operating said valve, the line leading to the valve from the cylinders being branched to supply pressure between the pistons of the balanced valve and to that side of one of them which is opposed to the pressure effective thereon from the supply line to the cylinders.

8. In combination with a truck having arms swingably mounted thereon for lifting a load through a position wherein the center of gravity of the load and arms is over the center of swing of the arms, hydraulic cylinders having pistons therein for actuating the arms, means for optionally supplying fluid pressure to either end of each cylinder and returning fluid from the other ends thereof, and means for automatically restricting flow that is being returned comprising a throttling bypass, a valve operable to direct return flow through the bypass or around the bypass, and means operable by the pressure supplied to the cylinders for operating said valve whereby flow returning from the cylinders will be directed around the bypass until the center of gravity of the load and arms has passed over the center of swing and then due to the decrease of pressure supplied to the cylinders the return flow will be directed through the bypass to retard descent of the arms and a throttling check valve in the supply line to the cylinders.

9. In combination with a truck having arms swingably mounted thereon for lifting a load through a passage wherein the center of gravity of the load and arms is over the center of swing of the arms, means including one or more hydraulic cylinders having pistons therein for actuating the arms, conduits leading to the opposite ends of the cylinders, valve means for optionally supplying fluid pressure through either of said conduits to either of the ends of the cylinders, one of said conduits having a throttling bypass therein, a throttling check valve in the bypass, means responsive to pressure in the other of said conduits for directing flow leading from the cylinders through the bypass or around the bypass and arranged to direct returning fluid through the bypass when the pressure in the other of said conduits falls below a predetermined degree and a throttling check valve in the other of said conduits.

ANATOLY LANKOVSKI.
MICHAEL GRAVES.

REFERENCES CITED

The following references are of record in the file of this patent:

UNITED STATES PATENTS

| Number | Name | Date |
|---|---|---|
| 1,970,181 | Monroe | Aug. 14, 1934 |
| 2,244,894 | Parker | June 10, 1941 |
| 2,286,723 | Frost | June 16, 1942 |
| 2,316,760 | Andersen et al. | Apr. 20, 1943 |